United States Patent
Li et al.

(10) Patent No.: US 10,120,488 B2
(45) Date of Patent: *Nov. 6, 2018

(54) DISPLAY METHOD AND DISPLAY DEVICE

(71) Applicants: Lenovo (Beijing) Co., Ltd., Haidian District, Beijing (CN); Beijing Lenovo Software Ltd., Haidian District, Beijing (CN)

(72) Inventors: Bin Li, Beijing (CN); Yiqiang Yan, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 68 days.

This patent is subject to a terminal disclaimer.

(21) Appl. No.: 15/203,080

(22) Filed: Jul. 6, 2016

(65) Prior Publication Data

US 2016/0313857 A1 Oct. 27, 2016

Related U.S. Application Data

(63) Continuation of application No. 14/129,729, filed as application No. PCT/CN2012/077527 on Jun. 26, 2012, now Pat. No. 9,412,339.

(30) Foreign Application Priority Data

Jun. 27, 2011 (CN) .......................... 2011 1 0175697

(51) Int. Cl.
G06F 3/041 (2006.01)
G09G 5/00 (2006.01)
(Continued)

(52) U.S. Cl.
CPC ............ *G06F 3/0416* (2013.01); *G06F 3/041* (2013.01); *G06F 3/0412* (2013.01);
(Continued)

(58) Field of Classification Search
CPC .............................. G06F 1/1673; G06F 1/1616
See application file for complete search history.

(56) References Cited

U.S. PATENT DOCUMENTS

2003/0210513 A1* 11/2003 Yen ........................ G06F 1/1618
361/679.06
2005/0157456 A1* 7/2005 Wu ......................... G06F 1/162
361/679.09
(Continued)

FOREIGN PATENT DOCUMENTS

| CN | 1402116 A | 3/2003 |
|---|---|---|
| CN | 1991702 | 7/2007 |

(Continued)

OTHER PUBLICATIONS

PCT/CN2012/077527 International Search Report dated Oct. 11, 2012 (6 pages including English translation).
(Continued)

*Primary Examiner* — Carolyn R Edwards
(74) *Attorney, Agent, or Firm* — Brinks Gilson & Lione; John C. Freeman

(57) ABSTRACT

A display method and display device are described where the method includes when a first device is in a first status, the first device displays a first output content of the first device in a first display area of a display module, when it is detected that the first device goes into a second status from the first status, the first device displays the first output content in a second display area of the display module, and displays a second output content in a third display area of the display module, wherein, the first output content is different from the
(Continued)

second output content, the second area does not overlap with the third area, and the first area contains the second and third areas.

18 Claims, 4 Drawing Sheets

(51) Int. Cl.
    *G09G 5/12*     (2006.01)
    *G06F 3/0488*     (2013.01)

(52) U.S. Cl.
    CPC .......... *G06F 3/04886* (2013.01); *G09G 5/00* (2013.01); *G09G 5/12* (2013.01); *G09G 2340/0464* (2013.01)

(56) References Cited

U.S. PATENT DOCUMENTS

| | | | |
|---|---|---|---|
| 2007/0085759 A1* | 4/2007 | Lee | G06F 1/1616 345/1.1 |
| 2010/0177047 A1* | 7/2010 | Brenneman | G06F 1/1616 345/173 |
| 2012/0068936 A1* | 3/2012 | Kim | G06F 1/1626 345/169 |

FOREIGN PATENT DOCUMENTS

| | | |
|---|---|---|
| CN | 101059735 A | 10/2007 |
| CN | 101079021 A | 11/2007 |
| CN | 101770290 | 7/2010 |
| CN | 101945150 A | 1/2011 |
| CN | 102077156 A | 5/2011 |
| JP | 9062604 | 3/1997 |
| KR | 20090113562 | 11/2009 |

OTHER PUBLICATIONS

PCT/CN2012/077527 English translation of Written Opinion dated Oct. 11, 2012 (5 pages).
PCT/CN2012/077527 International Preliminary Report on Patentability dated Jan. 7, 2014 (5 pages).
Chinese First Office Action with English Translation for related Application No. 201110175697.2 dated Oct. 10, 2014, 14 pages.

* cited by examiner

DISPLAY METHOD AND DISPLAY DEVICE

This application is a continuation of U.S. patent application Ser. No. 14/129,729 filed Dec. 27, 2013, which was a National Stage filing of International Application No. PCT/CN2012/077527 filed Jun. 26, 2012, which claimed priority to Chinese Patent Application No. 201110175697.2 filed Jun. 27, 2011, the entire contents of each are incorporated herein by reference.

BACKGROUND

The present disclosure relates to the field of communication technology, and especially to a display method and a display device.

A portable device in the prior art includes an input device or a corresponding input region. Thus, the size of the display region for displaying output content is smaller than that of the maximum display region supported by the portable device. Even if the portable device is connected to a new input device which is more convenient for the user to perform input operation, it will still display according to the size of the original display region, resulting in that it is difficult to match the output content with the big screen.

It can be known from the above that it is difficult to meet different display requirements for the user to the output content when the device is in different states, in the display screen of the portable device in the prior art.

SUMMARY

An object of the embodiments of the present disclosure is to provide a display method and a display device to solve the problem that it is difficult to meet different display requirements for the user to the output content when the portable device is in different states.

In order to solve the above technical problem, an embodiment of the present disclosure provides the following technical solution.

A display method applied to a first device including a display module and a first input module is provided, the first device having at least a first state in which it is connected to a second device including a second input module, the display module displays output content of the first device in the first state and is capable of receiving input from the second input module, and a second state in which it is disconnected with the second device, the display module displays the output content of the first device and is capable of receiving input from the first input module, the method comprising steps of: displaying a first output content of the first device in a first region of the display module by the first device, when the first device is in the first state; displaying the first output content in a second region of the display module, and displaying a second output content in a third region of the display module by the first device, when it is detected that the first device enters the second state from the first state; wherein the first output content is different from the second output content, the second region is not overlapped with the third region, and the first region contains the second region and the third region.

The first input module comprises a touch sensitive module; the touch sensitive module is arranged to be overlapped with at least the third region of the display module, and is operable to sense a touch operation on the first output content by an operating object.

The second output content comprises an operation instruction identifier for triggering a command corresponding to the operation instruction identifier when it is detected that a touch sensitive region corresponding to the operation instruction identifier senses an operation by the operating object.

Said displaying a second output content in a third region of the display module comprises: determining the second output content associated with the first output content based on a first input content; and displaying the second output content in the third region of the display module.

The second output content comprises range information on touch operation region for prompting that a touch operation on the first output content can be made in the region limited by the range information.

The display module further includes a fourth region contained in the first region, in the second state, the first input module comprises a touch sensitive module; the touch sensitive module is overlapped with the first region of the display module in the first state, and is operable to sense a touch operation on the first output content by an operating object; and in the second state, the touch sensitive module comprises a second touch sensitive region corresponding to the second region, a third touch sensitive region corresponding to the third region and a fourth sensitive region corresponding to the fourth region, the first device responds to touch operation in the second touch sensitive region and the third touch sensitive region by the operating object, and does not respond to touch operation in the fourth touch sensitive region by the operating object.

A display method applied to a first device including a display module and a first input module is also provided, the first device having at least a first state in which it is connected to a second device including a second input module and the display module displays a third output content of the second device in the first state, and a second state in which it is disconnected with the second device, the display module displays a first output content of the first device and is capable of receiving input from the first input module, the method comprising steps of: displaying the third output content of the second device in a first region of the display module by the first device, when the first device is in the first state; displaying the first output content in a second region of the display module, and displaying a second output content of the first device in a third region of the display module by the first device, when it is detected that the first device enters the second state from the first state; wherein the first output content is different from the second output content, the second region is not overlapped with the third region, and the first region contains the second region and the third region.

The first input module comprises a touch sensitive module; the touch sensitive module is arranged to be overlapped with at least the third region of the display module, and is operable to sense a touch operation on the first output content by an operating object.

The second output content comprises an operation instruction identifier for triggering a command corresponding to the operation instruction identifier when it is detected that a touch sensitive region corresponding to the operation instruction identifier senses an operation by the operating object.

said displaying a second output content in a third region of the display module comprises: determining the second output content associated with the first output content based on a first input content; and displaying the second output content in the third region of the display module.

The second output content comprises range information on touch operation region for prompting that a touch operation on the first output content can be made in the region limited by the range information.

The display module further includes a fourth region contained in the first region, in the second state, the first input module comprises a touch sensitive module; the touch sensitive module is overlapped with the first region of the display module in the first state, and is operable to sense a touch operation on the third output content by an operating object; and in the second state, the touch sensitive module comprises a second touch sensitive region corresponding to the second region, a third touch sensitive region corresponding to the third region and a fourth sensitive region corresponding to the fourth region, the first device responds to touch operation in the second touch sensitive region and the third touch sensitive region by the operating object, and does not respond to touch operation in the fourth touch sensitive region by the operating object.

A display device including a display module and a first input module is also provided, the display device as a first device having at least a first state in which it is connected to a second device including a second input module, the display module displays output content of the first device in the first state and is capable of receiving input from the second input module, and a second state in which it is disconnected with the second device, the display module displays the output content of the first device and is capable of receiving input from the first input module, the device further includes a detection module, in which: the display module is operable to display a first output content of the first device in a first region of the display module, when the first device is in the first state; the detection module is operable to detect whether the first device enters the second state from the first state or not; the display module is further operable to display the first output content in a second region of the display module, and to display a second output content in a third region of the display module, when it is detected that the first device enters the second state from the first state by the detection module; wherein the first output content is different from the second output content, the second region is not overlapped with the third region, and the first region contains the second region and the third region.

The first input module comprises a touch sensitive module; the touch sensitive module is arranged to be overlapped with at least the third region of the display module, and is operable to sense a touch operation on the first output content by an operating object.

The second output content comprises an operation instruction identifier for triggering a command corresponding to the operation instruction identifier when it is detected that a touch sensitive region corresponding to the operation instruction identifier senses an operation by the operating object; the display module is operable to determine the second output content associated with the first output content based on a first input content, and to display the second output content in the third region of the display module.

The second output content comprises range information on touch operation region for prompting that a touch operation on the first output content can be made in the region limited by the range information.

The display module further includes a fourth region contained in the first region, in the second state, the first input module comprises a touch sensitive module; in the first state, the touch sensitive module is overlapped with the first region of the display module, and is operable to sense a touch operation on the first output content by an operating object; and in the second state, the touch sensitive module comprises a second touch sensitive region corresponding to the second region, a third touch sensitive region corresponding to the third region and a fourth sensitive region corresponding to the fourth region, the first device responds to touch operation in the second touch sensitive region and the third touch sensitive region by the operating object, and does not respond to touch operation in the fourth touch sensitive region by the operating object.

A display device including a display module and a first input module is also provided, the first device as a first device having at least a first state in which it is connected to a second device including a second input module and the display module displays a third output content of the second device in the first state, and a second state in which it is disconnected with the second device, the display module displays a first output content of the first device and is capable of receiving input from the first input module, the device further includes a detection module, in which: the display module is operable to display the third output content of the second device in a first region of the display module, when the first device is in the first state; the detection module is operable to detect whether the first device enters the second state from the first state; the display module is further operable to display the first output content in a second region of the display module, and to display a second output content of the first device in a third region of the display module, when it is detected that the first device enters the second state from the first state; wherein the first output content is different from the second output content, the second region is not overlapped with the third region, and the first region contains the second region and the third region.

The first input module comprises a touch sensitive module; the touch sensitive module is arranged to be overlapped with at least the third region of the display module, and is operable to sense a touch operation on the first output content by an operating object.

The second output content comprises an operation instruction identifier for triggering a command corresponding to the operation instruction identifier when it is detected that a touch sensitive region corresponding to the operation instruction identifier senses an operation by the operating object; the display module is operable to determine the second output content associated with the first output content based on a first input content, and to display the second output content in the third region of the display module.

The second output content comprises range information on touch operation region for prompting that a touch operation corresponding to a fixed command can be made in the region limited by the range information.

The display module further includes a fourth region contained in the first region, in the second state, the first input module comprises a touch sensitive module; in the first state, the touch sensitive module is overlapped with the first region of the display module, and is operable to sense a touch operation on the third output content by an operating object; and in the second state, the touch sensitive module comprises a second touch sensitive region corresponding to the second region, a third touch sensitive region corresponding to the third region and a fourth sensitive region corresponding to the fourth region, the first device responds to touch operation in the second touch sensitive region and the third touch sensitive region by the operating object, and does not respond to touch operation in the fourth touch sensitive region by the operating object.

It can be known from the technical solutions provided in the embodiments of the present disclosure that, in the embodiments of the present disclosure, a first output content of the first device is displayed in a first region of the display module by the first device, when the first device is in the first state. The first output content is displayed in a second region of the display module, and a second output content is displayed in a third region of the display module by the first device, when it is detected that the first device enters the second state from the first state. The first output content is different from the second output content, the second region is not overlapped with the third region, and the first region contains the second region and the third region. With the embodiments of the present disclosure, the first device may display the first output content in the first region of the display module in the first state, and display the first output content in the second region of the display module in the second state. That is, the region for displaying the first output content when the first device is used alone is smaller than the region for displaying the first output content when the first device is connected with the second device.

BRIEF DESCRIPTION OF THE DRAWINGS

In order to describe the technical solutions in the embodiments of the present disclosure or in the prior art more clearly, the drawings necessary to be used in the description of the embodiments or the prior art will be described briefly. Apparently, to those of ordinary skill in the art, other drawings may be obtained based on these drawings without any inventive labor.

DETAILED DESCRIPTION

A display method and a display device are provided respectively, in the following embodiments of the present disclosure.

In order to make the technical solutions of the embodiments of the present disclosure better understood by those skilled in the art, and to make the above objects, features and advantages of the embodiments of the present disclosure more apparent, a further detailed description will be made to the technical solutions of the embodiments of the present disclosure with reference to the drawings.

Figure 1:
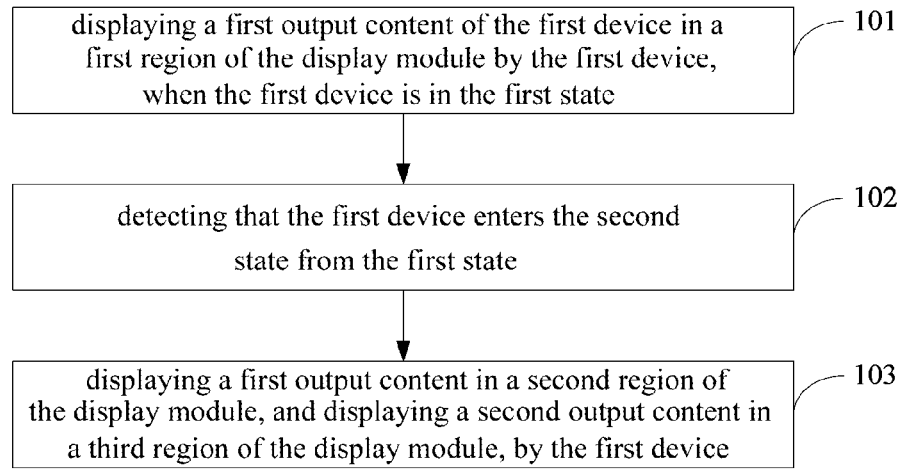
FIG. 1 is a flowchart showing a display method according to a first embodiment of the present disclosure.

Referring to FIG. 1, it is a flowchart showing a display method according to a first embodiment of the present disclosure, which is applied to a first device including a display module and a first input module, the first device having at least a first state in which it is connected to a second device including a second input module, the display module displays output content of the first device in the first state and is capable of receiving input from the second input module, and a second state in which it is disconnected with the second device, the display module displays the output content of the first device and is capable of receiving input from the first input module. The flow of this embodiment is as follows.

At Step 101, a first output content of the first device is displayed in a first region of the display module by the first device, when the first device is in the first state.

In the present embodiment, the first device may be a tablet, a smart TV or a cell phone. The display module may be a LCD display, a LED display etc. The first state is a connected state. Thus, the first device may be connected to a second device which may be a keyboard in particular, and the second input module is a key. Alternatively, the second device may be a dock including a keyboard, and the second input module is a key or a cursor control module such as a pointer or a touch pad. In the first state, the first device receives input from the second input module of the second device, and displays the first output content of the first device.

For example, when the first device is a tablet computer (a PAD device), which may be connected to a keyboard in the first state, at this time, the PAD device may receive input from the keyboard, and the first output content of the operating system ("OS") of the PAD device is displayed through the first region the size of which is consistent with the size of the display module.

At Step 102, it is detected that the first device enters the second state from the first state.

The first device has an interface for connecting to the second device. The first device has an interface detection module which may detect the plug state of the interface to decide whether the first device is in the first state in which the first device is connected to the second device, or in the second state in which the first device is disconnected with the second device. For example, the PAD device has a universal serial bus ("USB") interface. When the PAD is connected to a peripheral keyboard, it is detected that the PAD device enters the first state. When the keyboard connected to the USB interface is detached, it is detected that the PAD device enters the second state.

At Step 103, the first device displays the first output content in the second region of the display module, and displays the second output content in the third region of the display module.

The first output content is different from the second output content, the second region is not overlapped with the third region, and the first region contains the second region and the third region. That is, after the first device enters the second state from the first state, the system output is the first output content. That is, the output content of the system remains unchanged. However, the first output content is displayed through the first region in the first state, and is displayed through the second region smaller than the first region in the second state by the first device. That is, the region for displaying the first output content is reduced while the region for displaying other content is increased. That is, a third region for displaying the second output content is increased.

Further, the first input module may include a touch sensitive module, which is arranged to be overlapped with at least the third region of the display module, and is operable to sense a touch operation on the first output content by an operating object. When the first device is in the first state, input may be made through the connected second device, such as the keyboard, or may be made in combination with the first input module. When the first device is in the second state, touch input is made only through the touch sensitive module. For example, the touch input may be made on the touch sensitive module at least corresponding to the third region, which may be arranged in maximum to be overlapped with the first region. In the second state, still assume that the first device is the PAD device. When the PAD device is used alone, the touch input operation is carried out through the touch sensitive module. The second region for displaying the first output content of the OS on the display module is smaller than the first region in the first state. And, the third region may function as the touch gesture input area for displaying the touch input range or the touch input instruction identifier.

In particular, when the second output content is an operation instruction identifier, it is used to trigger a command corresponding to the operation instruction identifier when it is detected that a touch sensitive region corresponding to the operation instruction identifier senses an operation by the operating object. The operation instruction identifier includes a fixed operation instruction identifier, for example, a home button, a back button, etc., which is displayed by default when the first device enters the second state. Alternatively, the operation instruction identifier includes an instruction identifier associated with the first output content. For example, the OS of the first device performs a song playing application to display a player in the first region including a playlist, a play process and play control information etc., when a song is played by the player. When the first devices enters the second state, it is still displayed in the second region that the song is played by the player, and the instruction identifier corresponding to the player is displayed in the third region, which may include a "next song" instruction identifier, a "previous song" instruction identifier, a "volume adjustment" instruction identifier, etc. When it is detected that the "next song" instruction identifier is clicked by the operating object, the command for playing the next song corresponding to the instruction identifier is obtained to perform the command, so that the player in the first output content jumps to the next song in the playlist to play it. It can be seen that when the second output content is displayed in the third region of the display module, the second output content associated with the first output content may be determined based on the first output content, and the second output content is displayed in the third region of the display module. That is, the second output content is associated with the first output content. When the first output content is changed, the second output content is the operation instruction identifier corresponding to the changed first output content. For example, when the first output content is the player, the second output content corresponds to the operation instruction identifier for playing audio or video. When the first output content is a game, the second output content corresponds to the operation instruction identifier of the game.

Alternatively, the second output content may include range information on touch operation region for prompting that a touch operation on the first output content can be made in the region limited by the range information. For example, the range of the operation region may be prompted to the user by displaying with a filled-in color different from the first output content, for example, displaying black color. When a slide gesture is detected in the range of the operation region, the command corresponding to the slide gesture is performed. Further, it is enough to detect that there is the touch operation in the region, and it is not necessary to limit the location of the touch operation. For example, when the operation for sliding leftward is performed, no matter where the starting point of the sliding is located in the region, the command corresponding to the sliding leftward operation is generated as long as the operation for sliding leftward is detected. In addition, the command corresponding to the sliding operation may be a system level command. That is, no matter whatever the first output content is, the same command is issued. For example, uniformly, the sliding leftward operation corresponds to the backward command, the sliding rightward operation corresponds to the task manager command, the double click operation corresponds to the main menu invoking command, etc. Of course, similar to the above described embodiment, when the first output content is different, the same touch input gesture may correspond to different commands, which is not limited in the embodiments of the present disclosure.

In addition, when the first device is a portable device such as a tablet or a cell phone, since it is of a small size and is convenient for the user to be carried by hand, it has multiple holding manners. That is, the device is rotatable. The rotating direction may be a sliding direction with respect to the device, or may be a sliding direction with respect to the space. For example, with respect to the device, the leftward sliding to the space (leftward sliding to the device) represents backward operation when the device is used vertically, the downward sliding to the space (leftward sliding to the device) represents backward operation when the device is used horizontally. With respect to the space, the leftward sliding to the space (leftward sliding to the device) represents backward operation when the device is used vertically, and the leftward sliding to the space (upward sliding to the device) represents backward operation when the device is used horizontally. It can be seen that it should be determined with respect to the space, so that the sliding gesture with respect to the device and the corresponding command are switched when the leftward sliding corresponds to the same operation.

Further, the display module further includes a fourth region in the second state. The first region includes the second region, the third region and the fourth region which do not overlap with each other. In an embodiment, the sum of the areas of the second region, the third region and the fourth region in the second state is consistent with that of the first region in the first state. The touch sensitive module is overlapped with the first region of the display module in the first state, and is operable to sense a touch operation on the first output content by the operating object. That is, when the first device is a PAD device, although it may perform input operation by connecting a keyboard, the screen of its own still has a touch input function. In the second state, the touch sensitive module includes a second touch sensitive region corresponding to the second region, a third touch sensitive region corresponding to the third region and a fourth sensitive region corresponding to the fourth region in the second state, the first device responds to touch operation in the second touch sensitive region and the third touch sensitive region by the operating object, and does not respond to touch operation in the fourth touch sensitive region by the operating object. That is, the fourth touch sensitive region corresponding to the fourth region is an invalid touch region, to further reduce the area of the second region for displaying the first output content when the PAD device is used alone to be convenient for the user to operate. The range information on the display region may be displayed in the fourth region. For example, it is prompted which region is an invalid touch region for the touch operation by a special display color or a display frame. Further, for a better appearance, the logo information of the product may be displayed in the fourth region.

It is to be noted that the display module may do not include the fourth region as well, but the touch sensitive module includes a fourth touch sensitive region which does not overlap with the second touch sensitive region and the third touch sensitive region, and which does not respond to the touch input operation, either.

The display process of the first device entering the second state from the first state has been described in the above embodiment. Similarly, the display process of the first device entering the first state from the second state includes: displaying a first output content in a second region of the display module by the first device, and displaying the second output content in the third region of the display module, when the first device is in the second state; displaying the first output content of the first device in a first region of the display module by the first device, when it is detected that the first device enters the first state from the second state; wherein the first output content is different from the second output content, the second region is not overlapped with the third region, and the first region contains the second region and the third region.

Figure 2:
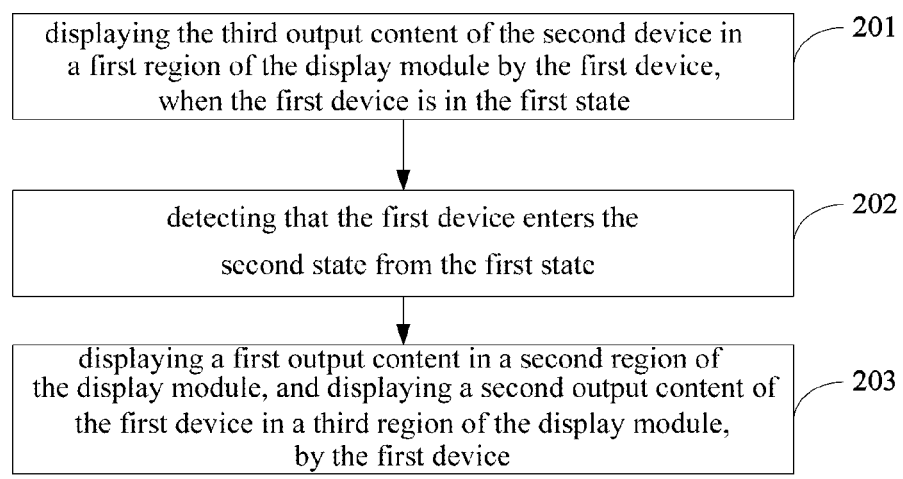
FIG. 2 is a flowchart showing a display method according to a second embodiment of the present disclosure.

Referring to FIG. 2, it is a flowchart of a display method according to a second embodiment of the present disclosure, which is applied to a first device including a display module and a first input module, the first device having at least a first state in which it is connected to a second device including a second input module, the display module displays a third output content of the second device in the first state, and is capable of receiving input of the second input module, and a second state in which it is disconnected with the second device, the display module displays a first output content of the first device and is capable of receiving input from the first input module. The flowchart of the method in this embodiment is as follows.

At Step S201, the third output content of the second device is displayed in a first region of the display module by the first device, when the first device is in the first state.

In the present embodiment, the first device may be a tablet, a smart TV or a cell phone. The display module may be a LCD display, a LED display etc. The first device may have a first OS working independently. The first state is a connected state. Thus, the first device may be connected to a second device which is a device including a second OS working independently, for example, a desktop PC, a notebook computer, a cell phone, a tablet computer. The second input module may be a button or a cursor control module, for example, a pointer or a touch pad etc. Since the first device and the second device have their own independent OSs, the first device displays the third output content of the second device when the first device receives the input of the second input module of the second device in the first state.

The embodiment of the present disclosure may be applied in a hybrid system consisted of the first device and the second device, wherein the hybrid system may be combined by two independent devices, or may include one portable terminal of the first device and the second device. For example, the hybrid system may be consisted of a notebook computer with a single system and a smart phone, or may be consisted of a notebook computer with a hybrid system architecture.

The first device may include a first hardware system, for example a slave system based on an X86 architecture or an ARM architecture processor. The second device may include a second hardware system, for example a master system based on an X86 architecture or an ARM architecture processor. That is, the first system and the second system may be based on the same hardware architecture, or may be based on different hardware architectures. In addition, the master system and the slave system may be distinguished based on the importance, the priority, the processing capability or the power consumption. For example, the master system is of a high importance, high priority, powerful processing capability or high power consumption, while the slave system is opposite to that. Alternatively, the different names may be just for distinguishing, but not limit the importance, the priority, the processing capability or the power consumption of the system.

Further, the second device may include a second hardware system having a second OS, for example a second hardware system installed with a desktop device OS (e.g., Windows 7, Linux or MacOS) or installed with a portable device OS (e.g., Android, Symbian or iOS). The first device may include a first hardware system having a first OS, for example a first hardware system installed with a desktop device OS (e.g., Windows 7, Linux or MacOS) or installed with a portable device OS (e.g., Android, Symbian or iOS). That is, the first OS and the second OS may be the same or may be different, as long as they may run the corresponding hardware system. Optionally, the second device is a master system which is based on the X86 architecture processor and installed with a desktop OS. The first device is a slave system which is based on the ARM architecture processor and installed with a portable device OS.

The first device has a first interface, the second device has a second interface, and the first device and the second device are connected or disconnected through the first interface and the second interface. The first interface and the second interface may be a wire interface or a wireless interface, which is not limited here, as long as the first interface of the first device and the second interface of the second device may connect and disconnect the two devices and may communicate the system state information.

When the first interface and the second interface are wire interfaces, the first interface may be a USB interface or a UART interface, or a custom interface to enable the connection or disconnection between the two devices. The second interface may also be a corresponding USB interface or a UART interface, or a custom interface to enable the connection or disconnection between the two devices. When the first interface and the second interface are wireless interfaces, they may be matched Bluetooth interfaces, infrared ray interfaces, or WiFi interfaces.

Taking the notebook with a hybrid system architecture as an example, the first device and the second device are two independent systems which may work independently or cooperatively. The second device is arranged at the main unit (main case, host) side with respect to the single system notebook, and includes a processing device, an input device and no display device. The first device is arranged at the display side with respect to the single system notebook, and includes a processing device, an input device and a display device. When the first device and the second device combine to work, they may share some hardware devices, such as the display device. Since the display device is integrated with the first device, it is only provided to the first device when the first device and the second device are disconnected, and may be provided to the first device or the second device when the first device and the second device are connected. That is, the running result/output content of the first device and/or the second device may be displayed through the display device.

That is, in the portable device having a hybrid system architecture, the tablet computer having a slave system is equivalent to the first device in the embodiment of the present disclosure, and the main unit having a master system is equivalent to the second device in the embodiment of the present disclosure.

In particular, taking an example in which the first device is a table computer having a slave OS and the second device is a main unit having a master OS and includes a keyboard, the PAD device and the master device composes the dual system device in the first state, wherein the first device may be referred to the slave device of the dual system, and the second device is referred to the master device of the dual system. At this time, the PAD system may function as the display section which displays a third output content of the master OS of the master device in the dual system device. The third output content is displayed in the first region the size of which is consistent with that of the display module.

At Step S202, it is detected that the first device enters the second state from the first state.

The first device has an interface for connecting the second device, and has an interface detection module for detecting the plug state of the interface to decide whether the first device is in the first state in which the first device is connected with the second device, or the second state in which the first device is disconnected with the second device. For example, the PAD device has a USB interface. When the PAD device and the main case are connected, it is detected that the PAD device enters the first state. When the main case connected to the USB interface is plug off, it is detected that the PAD device enters the second state.

At Step S203, the first device displays the first output content in a second region of the display module, and displays a second output content of the first device in a third region of the display module.

The first output content is different from the second output content, the second region is not overlapped with the third region, and the first region contains the second region and the third region. In the present embodiment, after the first device enters the second state from the first state, the system output content is changed from the third output content of the second device to the first output content of the first device. That is, the system output content is changed. Since the first device and the second device may be of the same hardware system and software system, the first output content and the third output content may be the same when the software environment is the same (the same OS, the same software application). That is, when the first device and the second device are separated, the second device acquires the operation parameter according to its operation environment and transmits it to the first device. The first device recovers the operation environment according to the operation parameter. Of course, the first output content and the third output content come from different devices and they may not be the same.

In addition to the change to the output content, the first device displays the third output content of the second device through its first region in the first state, and displays the first output content of the first device through the second region smaller than the first region in the second state. In the second state, the first device increases its region for displaying other content, i.e., increases the third region for displaying the second output content, while decreasing the region for displaying the first output content.

Taking the example in which the first device is a PAD device, when the PAD device is used alone, the PAD device displays the first output content of the slave OS of the slave device in the dual system device. When the PAD device is used in combination with the main case, it displays the third output content of the master OS of the master device of the dual system device. That is, the output content displayed when PAD device and the main case are combined together is different from the output content displayed when the PAD device is used alone.

Further, the first input module may include a touch sensitive module. The touch sensitive module is arranged to be overlapped with at least the third region of the display module, and is operable to sense a touch operation on the first output content by an operating object. When the first device is in the first state, the display module displays the third output content output by the second device. The second device may be performed by the second input module included in the second device, for example, the keyboard, directly. The second device responds to the input of the second input module, and changes its output content. Alternatively, the input may be done by using the first input module in cooperation. That is, the input of the first input module is transmitted to the second device. The second device responds to the input from the first input module and changes its output content. When the first device is in the second state, the touch input may be done only by the touch sensitive module. For example, the touch input is done at least by the touch sensitive module corresponding to the third region, which is overlapped with the first region in maximum. In the second state, still assuming that the first device is a PAD device, the touch input operation is performed by the touch sensitive module when the PAD device is used alone. The second region for displaying the first output content of the OS on the display module is smaller than the first region in the first state. The third region may be used as the touch gesture input area for displaying the touch input range or the touch input instruction identifier.

In particular, when the second output content is an operation instruction identifier, it is used to trigger a command corresponding to the operation instruction identifier when it is detected that a touch sensitive region corresponding to the operation instruction identifier senses an operation by the operating object. The operation instruction identifier includes a fixed operation instruction identifier, for example, a home button, a back button, etc., which is displayed by default when the first device enters the second state. Alternatively, the operation instruction identifier includes an instruction identifier associated with the first output content. For example, the OS of the first device performs a song playing application to display a player in the first region including a playlist, a play process and play control information etc., when a song is played by the player. When the first devices enters the second state, it is still displayed in the second region that the song is played by the player, and the instruction identifier corresponding to the player is displayed in the third region, which may include a "next song" instruction identifier, a "previous song" instruction identifier, a "volume adjustment" instruction identifier, etc. When it is detected that the "next song" instruction identifier is clicked by the operating object, the command for playing the next song corresponding to the instruction identifier is obtained to perform the command, so that the player in the first output content jumps to the next song in the playlist to play it. It can be seen that when the second output content is displayed in the third region of the display module, the second output content associated with the first output content may be determined based on the first output content, and the second output content is displayed in the third region of the display module. That is, the second output content is associated with the first output content. When the first output content is changed, the second output content is the operation instruction identifier corresponding to the changed first output content. For example, when the first output content is the player, the second output content corresponds to the operation instruction identifier for playing audio or video. When the first output content is a game, the second output content corresponds to the operation instruction identifier of the game.

Alternatively, the second output content may include range information on touch operation region for prompting that a touch operation on the first output content can be made in the region limited by the range information. For example, the range of the operation region may be prompted to the user by displaying with a filled-in color different from the first output content, for example, displaying black color. When a slide gesture is detected in the range of the operation region, the command corresponding to the slide gesture is performed. Further, it is enough to detect that there is the touch operation in the region, and it is not necessary to limit the location of the touch operation. For example, when the operation for sliding leftward is performed, no matter where the starting point of the sliding is located in the region, the command corresponding to the sliding leftward operation is generated as long as the operation for sliding leftward is detected. In addition, the command corresponding to the sliding operation may be a system level command. That is, no matter whatever the first output content is, the same command is issued. For example, uniformly, the sliding leftward operation corresponds to the back command, the sliding rightward operation corresponds to the task manager command, the double click operation corresponds to the main menu invoking command, etc. Of course, similar to the above described embodiment, when the first output content is different, the same touch input gesture may correspond to different commands, which is not limited in the embodiments of the present disclosure.

In addition, when the first device is a portable device such as a tablet or a cell phone, since it is of a small size and is convenient for the user to be carried by hand, it has multiple holding manners. That is, the device is rotatable. The rotating direction may be a sliding direction with respect to the device, or may be a sliding direction with respect to the space. For example, with respect to the device, the leftward sliding to the space (leftward sliding to the device) represents backward operation when the device is used vertically, the downward sliding to the space (leftward sliding to the device) represents backward operation when the device is used horizontally. With respect to the space, the leftward sliding to the space (leftward sliding to the device) represents backward operation when the device is used vertically, and the leftward sliding to the space (upward sliding to the device) represents backward operation when the device is used horizontally. It can be seen that it may be determined with respect to the space, so that the sliding gesture with respect to the device and the corresponding command are switched when the leftward sliding corresponds to the same operation.

Further, the display module further includes a fourth region in the second state. The first region includes the second region, the third region and the fourth region which do not overlap with each other. In an embodiment, the sum of the areas of the second region, the third region and the fourth region in the second state is consistent with that of the first region in the first state. The touch sensitive module is overlapped with the first region of the display module in the first state, and is operable to sense a touch operation on the third output content by an operating object. That is, when the first device is a PAD device, although it may perform input operation by connecting a keyboard, the screen of its own still has a touch input function. In the second state, the touch sensitive module includes a second touch sensitive region corresponding to the second region, a third touch sensitive region corresponding to the third region and a fourth sensitive region corresponding to the fourth region in the second state, the first device responds to touch operation in the second touch sensitive region and the third touch sensitive region by the operating object, and does not respond to touch operation in the fourth touch sensitive region by the operating object. That is, the fourth touch sensitive region corresponding to the fourth region is an invalid touch region, to further reduce the area of the second region for displaying the first output content when the PAD device is used alone to be convenient for the user to operate. The range information on the display region may be displayed in the fourth region. For example, it is prompted which region is the invalid touch region for the touch operation by a special display color or a display frame. Further, for a better appearance, the logo information of the product may be displayed in the fourth region.

It is to be noted that the display module may do not include the fourth region as well, but the touch sensitive module includes a fourth touch sensitive region which does not overlap with the second touch sensitive region and the third touch sensitive region, and which does not respond to the touch input operation, either.

The display process of the first device entering the second state from the first state has been described in the above embodiment. Similarly, the display process of the first device entering the first state from the second state includes: displaying a first output content of the first device in a second region of the display module by the first device, and displaying the second output content in the third region of the display module when the first device is in the second state; displaying the third output content of the second device in a first region of the display module by the first device, when it is detected that the first device enters the first state from the second state; wherein the first output content is different from the second output content, the second region is not overlapped with the third region, and the first region contains the second region and the third region.

Figure 3:
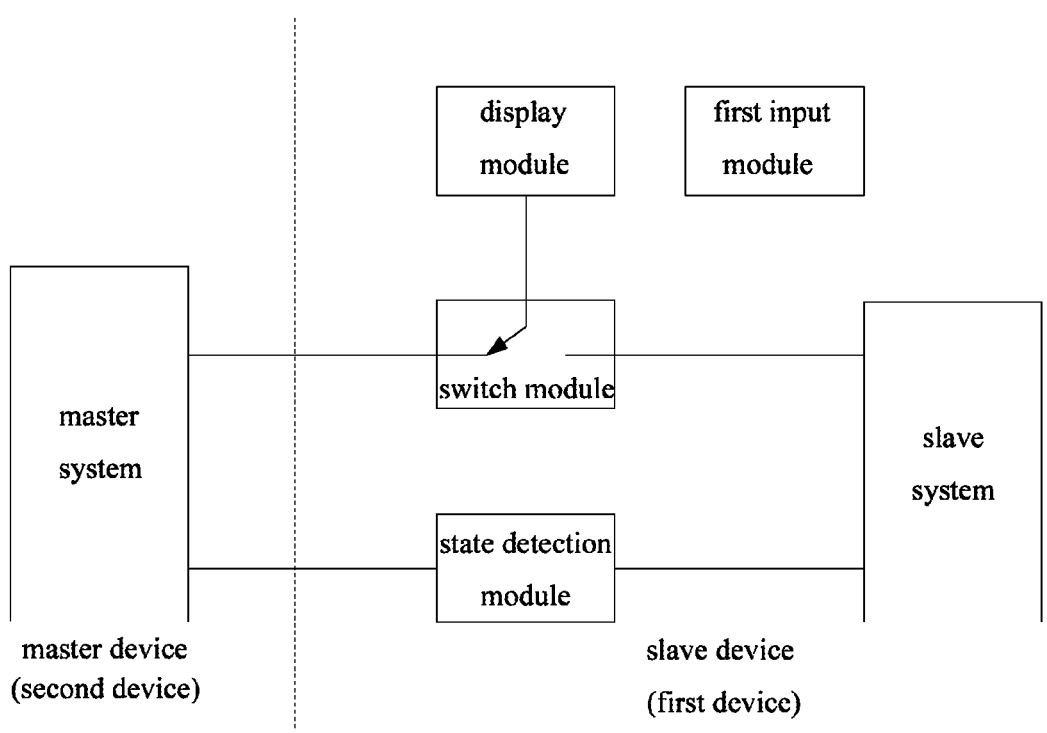
FIG. 3 is a structural schematic diagram showing a connection between a first device and a second device in the present disclosure.

Referring to FIG. 3, it is a structural schematic diagram showing a dual system device which may be formed by the first device and the second device combining together.

The first device and the second device may be combined into a dual system device to use. Assume that the first device is a PAD device having a touch input function, the second device is a main unit having a keyboard. It can be known from the description of the above embodiment that the plug state between the master device and the slave device is detected by the state detection module. That is, the state detection module may detect the slave device is in the first state in which it is connected to the master device, or the second state in which it is separated from the master device. When it is in the first state, the switch module is controlled to switch to display the third output content of the master system through the first region of the display module. When it is in the second state, the switch module is controlled to switch to display the first output content of the slave system through the second region of the display module. The region distinguishing of the display module in different states and the relationships between the regions are consistent with those described in the above embodiment, and are not described here to avoid redundancy.

Referring to FIG. 4, it is a schematic diagram of a display region of a PAD device in the first state.

Figure 4A:
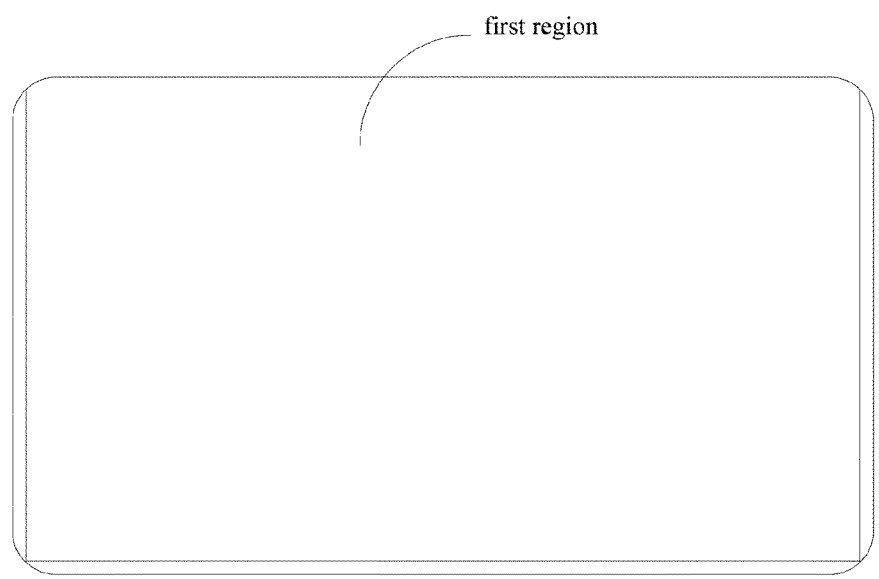
FIG. 4A is a schematic diagram of a display region in which a PAD device is in a first state in the present disclosure.

It can be known from FIG. 4A that the size of the first display region of the PAD device is consistent with that of the whole display module.

Figure 4B:
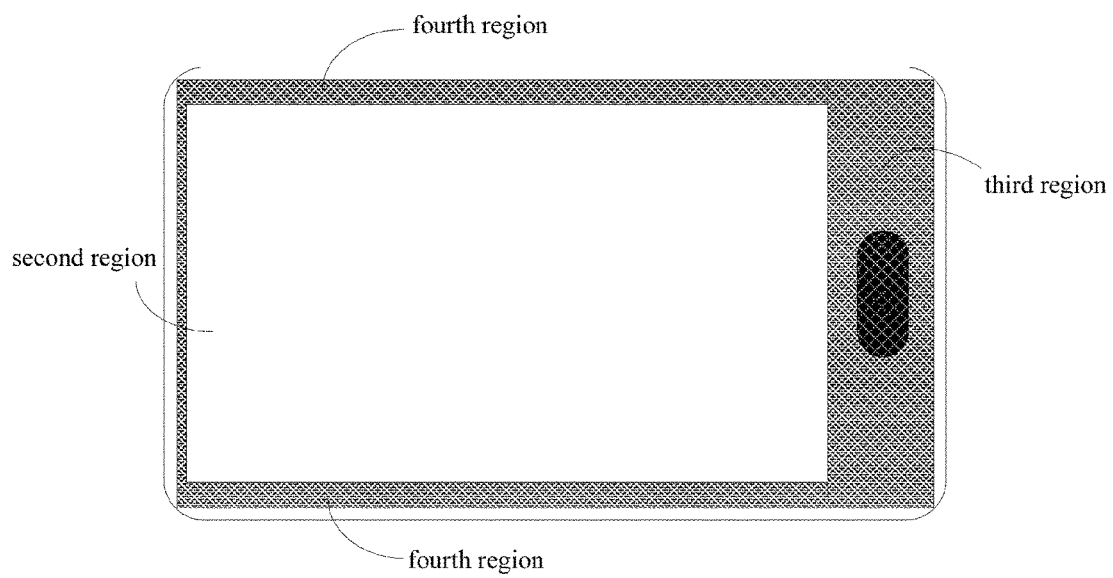
FIG. 4B is a schematic diagram of a display region in which the PAD device is in a second state in the present disclosure.

Referring to FIG. 4B, it is a schematic diagram of a display region of a PAD device in the second state.

It can be known from FIG. 4B that the display module of the PAD device includes the second region, the third region and the fourth region in the second state. The dashed line shown in FIG. 4B is to distinguish the boundary between the third region and the fourth region, which is not visible in the real application. The content displayed in the individual region is as described in the above embodiment, and will not be described here to avoid redundancy.

It can be known from FIGS. 4A and 4B that the first device in the embodiment of the present disclosure may display the third output content through the first region of the display module in the first state, and may display the first output content through the second region of the display module in the second state. When the first device is used alone, the region for displaying the first output content is smaller than the region for displaying the third output content when the first device is connected to the second device, especially when the first device is a PAD device. Thereby, the user requirement for the screen display when the two systems are combined is met, and the user experience is improved.

The present disclosure also provides an embodiment of a display device corresponding to the display method of the embodiment of the present disclosure.

Figure 5:
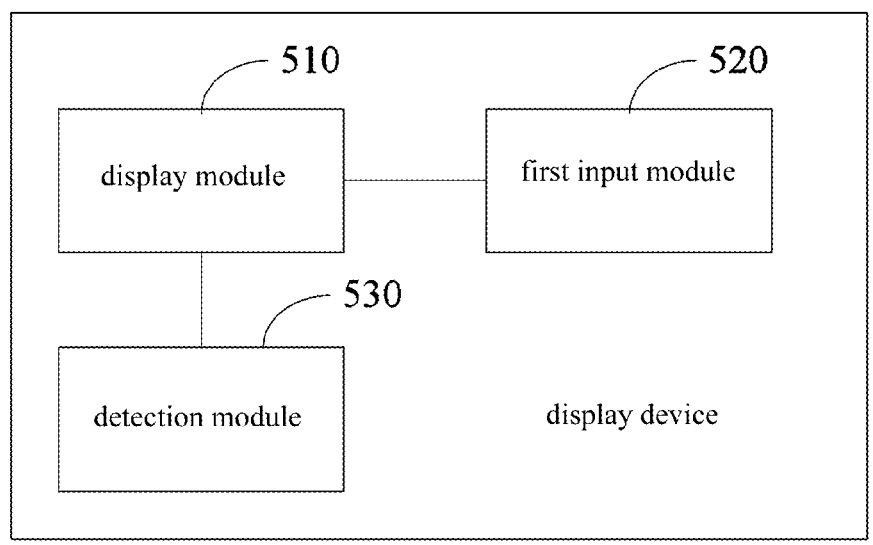
FIG. 5 is a block diagram showing a display device according to an embodiment of the present disclosure.

Referring to FIG. 5, it is a block diagram of a display device of an embodiment of the present disclosure.

The display device includes a display module 510, a first input module 520 and a detection module 530 as the first device.

An application of the display device of the present embodiment is as follows.

The first device has least a first state in which it is connected to a second device including a second input module, the display module 510 displaying output content of the first device in the first state and being capable of receiving input from the second input module, and a second state in which it is disconnected with the second device, and the display module 510 displays the output content of the first device.

The display module 510 is operable to display a first output content of the first device in a first region of the display module, when the first device is in the first state.

The detection module 530 is operable to detect whether the first device enters the second state from the first state or not.

The display module 510 is further operable to display the first output content in a second region of the display module, and to display a second output content in a third region of the display module, when it is detected that the first device enters the second state from the first state by the detection module. The first output content is different from the second output content, the second region is not overlapped with the third region, and the first region contains the second region and the third region.

Further, the first input module 520 may include a touch sensitive module which is not shown in FIG. 5. The touch sensitive module is arranged to be overlapped with at least the third region of the display module, and is operable to sense a touch operation on the first output content by an operating object.

The second output content may include an operation instruction identifier for triggering a command corresponding to the operation instruction identifier when it is detected that a touch sensitive region corresponding to the operation instruction identifier senses an operation by the operating object. The display module 510 is operable to determine the second output content associated with the first output content based on a first input content, and to display the second output content in the third region of the display module.

The second output content comprises range information on touch operation region for prompting that a touch operation on the first output content can be made in the region limited by the range information.

The display module 510 further includes a fourth region contained in the first region, in the second state. The first input module comprises a touch sensitive module. The touch sensitive module is overlapped with the first region of the display module in the first state, and is operable to sense a touch operation on the first output content by an operating object. The touch sensitive module comprises a second touch sensitive region corresponding to the second region, a third touch sensitive region corresponding to the third region and a fourth sensitive region corresponding to the fourth region in the second state, the first device responds to touch operation in the second touch sensitive region and the third touch sensitive region by the operating object, and does not respond to touch operation in the fourth touch sensitive region by the operating object.

Another application of the display device of the embodiment is as follows.

The display device includes a display module and a first input module as the first device. The first device has at least a first state in which it is connected to a second device including a second input module and the display module displays a third output content of the second device in the first state, and a second state in which it is disconnected with the second device, the display module displays a first output content of the first device and is capable of receiving input from the first input module.

The display module 510 is operable to display the third output content of the second device in a first region of the display module, when the first device is in the first state.

The detection module 520 is operable to detect whether the first device enters the second state from the first state.

The display module 510 is further operable to display the first output content in a second region of the display module, and to display a second output content of the first device in a third region of the display module, when it is detected that the first device enters the second state from the first state; wherein the first output content is different from the second output content, the second region is not overlapped with the third region, and the first region contains the second region and the third region.

It can be known from the description of the above embodiments that, in the embodiment of the present disclosure, when the first device is in the first state, the first device displays the third output content of the second device in the first region of the display module. When it is detected that the first device enters the second state from the first state, the first device displays the first output content in the second region of the display module, and displays the second output content in the third region of the display module. The first output content is different from the second output content, the second region is not overlapped with the third region, and the first region contains the second region and the third region. By applying the embodiment of the present disclosure, the first device may display the third output content through the first region of the display module in the first state, and display the first output content through the second region of the display module in the second state. That is, the region for displaying the first output content when the first device is used alone is smaller than the region for displaying the third output content when the first device is connected to the second device. The user requirement for screen display when the two systems are combined is met, and the user experience is improved, especially when the first device is a portable device.

Those skilled in the art may understand that the technology in the embodiments of the present disclosure may be realized by software in combination with necessary general hardware platform. Based on such understanding, the technical solution, or at least the part which contribute to the prior art, in the embodiment of the present disclosure, in essence, may be realized by software product, which may be stored in a storage medium such as a ROM/RAM, a magnetic diskette, an optical disk, etc., and include several instructions which may cause a computer device, such as a PC, a server or a network device etc., to perform the method according to the embodiments, or at least certain parts of the embodiments of the present disclosure.

The embodiments in the present specification are described in a step-by-step way, the same or similar parts between the embodiments may be referred to with each other. The emphasis of each embodiment is its difference from the other embodiments. Especially, for the system embodiment, since it is basically similar to the method embodiment, it is described briefly, and the relevant parts may refer to the description of the method embodiment.

The implementations of the present disclosure as described above do not limit the protection scope of the present disclosure. Any change, equivalent substitution or improvement shall fall within the protection scope of the present disclosure as long as it is within the spirit and principle of the present disclosure.

The invention claimed is:

1. A display method applied to a first device including a display module and a first input module, the first device having at least a first state in which it is connected to a second device including a second input module, the display module displays output content of the first device in the first state and is capable of receiving input from the second input module, and a second state in which it is disconnected with the second device, the display module displays the output content of the first device and is capable of receiving input from the first input module, the method comprising steps of:
displaying a first output content of the first device in a first region of the display module by the first device, when the first device is in the first state;
displaying the first output content in a second region of the display module, and displaying a second output content in a third region of the display module by the first device, when it is detected that the first device enters the second state from the first state;
wherein the first output content is different from the second output content, the second region is not overlapped with the third region, and the first region contains the second region and the third region and wherein the first region, the second region and the third region are within the same display module.

2. The method of claim 1, wherein the first input module comprises a touch sensitive module;
the touch sensitive module is arranged to be overlapped with at least the third region of the display module, and is operable to sense a touch operation on the first output content by an operating object.

3. The method of claim 2, wherein the second output content comprises an operation instruction identifier for triggering a command corresponding to the operation instruction identifier when it is detected that a touch sensitive region corresponding to the operation instruction identifier senses an operation by the operating object.

4. The method of claim 3, wherein said displaying the second output content in a third region of the display module comprises:
determining the second output content associated with the first output content based on a first input content; and
displaying the second output content in the third region of the display module.

5. The method of claim 2, wherein the second output content comprises range information on touch operation region for prompting that a touch operation on the first output content can be made in the region limited by the range information.

6. A display method applied to a first device including a display module and a first input module, the first device having at least a first state in which it is connected to a second device including a second input module and the display module displays a third output content of the second device in the first state, and a second state in which it is disconnected with the second device, the display module displays a first output content of the first device and is capable of receiving input from the first input module, the method comprising steps of:
displaying the third output content of the second device in a first region of the display module by the first device, when the first device is in the first state;
displaying the first output content in a second region of the display module, and displaying a second output content of the first device in a third region of the display module by the first device, when it is detected that the first device enters the second state from the first state;
wherein the first output content is different from the second output content, the second region is not overlapped with the third region, and the first region contains the second region and the third region and wherein the first region, the second region and the third region are within the same display module.

7. The method of claim 6, wherein the first input module comprises a touch sensitive module;
the touch sensitive module is arranged to be overlapped with at least the third region of the display module, and is operable to sense a touch operation on the first output content by an operating object.

8. The method of claim 7, wherein the second output content comprises an operation instruction identifier for triggering a command corresponding to the operation instruction identifier when it is detected that a touch sensitive region corresponding to the operation instruction identifier senses an operation by the operating object.

9. The method of claim 8, wherein said displaying a second output content in a third region of the display module comprises:
determining the second output content associated with the first output content based on a first input content; and
displaying the second output content in the third region of the display module.

10. The method of claim 7, wherein the second output content comprises range information on touch operation region for prompting that a touch operation on the first output content can be made in the region limited by the range information.

11. A display device including a display module and a first input module, the display device as a first device having at least a first state in which it is connected to a second device including a second input module, the display module displays output content of the first device in the first state and is capable of receiving input from the second input module, and a second state in which it is disconnected with the second device, the display module displays the output content of the first device and is capable of receiving input from the first input module, the device further includes a detection module, in which:
- the display module is operable to display a first output content of the first device in a first region of the display module, when the first device is in the first state;
- the detection module is operable to detect whether the first device enters the second state from the first state or not;
- the display module is further operable to display the first output content in a second region of the display module, and to display a second output content in a third region of the display module, when it is detected that the first device enters the second state from the first state by the detection module;
- wherein the first output content is different from the second output content, the second region is not overlapped with the third region, and the first region contains the second region and the third region and wherein the first region, the second region and the third region are within the same display module.

12. The device of claim 11, wherein the first input module comprises a touch sensitive module;
- the touch sensitive module is arranged to be overlapped with at least the third region of the display module, and is operable to sense a touch operation on the first output content by an operating object.

13. The device of claim 12, wherein the second output content comprises an operation instruction identifier for triggering a command corresponding to the operation instruction identifier when it is detected that a touch sensitive region corresponding to the operation instruction identifier senses an operation by the operating object;
- the display module is operable to determine the second output content associated with the first output content based on a first input content, and to display the second output content in the third region of the display module.

14. The device of claim 12, wherein the second output content comprises range information on touch operation region for prompting that a touch operation on the first output content can be made in the region limited by the range information.

15. A display device including a display module and a first input module, the first device as a first device having at least a first state in which it is connected to a second device including a second input module and the display module displays a third output content of the second device in the first state, and a second state in which it is disconnected with the second device, the display module displays a first output content of the first device and is capable of receiving input from the first input module, the device further includes a detection module, in which:
- the display module is operable to display the third output content of the second device in a first region of the display module, when the first device is in the first state;
- the detection module is operable to detect whether the first device enters the second state from the first state;
- the display module is further operable to display the first output content in a second region of the display module, and to display a second output content of the first device in a third region of the display module, when it is detected that the first device enters the second state from the first state;
- wherein the first output content is different from the second output content, the second region is not overlapped with the third region, and the first region contains the second region and the third region and wherein the first region, the second region and the third region are within the same display module.

16. The device of claim 15, wherein the first input module comprises a touch sensitive module;
- the touch sensitive module is arranged to be overlapped with at least the third region of the display module, and is operable to sense a touch operation on the first output content by an operating object.

17. The device of claim 16, wherein the second output content comprises an operation instruction identifier for triggering a command corresponding to the operation instruction identifier when it is detected that a touch sensitive region corresponding to the operation instruction identifier senses an operation by the operating object;
- the display module is operable to determine the second output content associated with the first output content based on a first input content, and to display the second output content in the third region of the display module.

18. The device of claim 16, wherein the second output content comprises range information on touch operation region for prompting that a touch operation corresponding to a fixed command can be made in the region limited by the range information.

* * * * *